(12) United States Patent
Thomas et al.

(10) Patent No.: US 6,516,837 B2
(45) Date of Patent: Feb. 11, 2003

(54) METHOD OF INTRODUCING REFRIGERANTS INTO REFRIGERATION SYSTEMS

(75) Inventors: Raymond Hilton Percival Thomas, Niagara County, NY (US); Roy Phillip Robinson, Erie County, NY (US); Rajiv Ratna Singh, Erie County, NY (US); David Paul Wilson, Erie County, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/943,063

(22) Filed: Aug. 30, 2001

(65) Prior Publication Data

US 2002/0046568 A1 Apr. 25, 2002

Related U.S. Application Data

(60) Provisional application No. 60/235,746, filed on Sep. 27, 2000.

(51) Int. Cl.⁷ ............................... B65B 1/04
(52) U.S. Cl. ............. 141/67; 141/82; 141/98; 141/65; 252/68
(58) Field of Search ............. 141/65, 67, 98, 141/82; 252/67, 68, 69

(56) References Cited

U.S. PATENT DOCUMENTS

| | | | |
|---|---|---|---|
| 5,154,846 A | 10/1992 | Thomas et al. | |
| 5,254,280 A | 10/1993 | Thomas et al. | 252/68 |
| 5,370,812 A | * 12/1994 | Brown | 252/68 |
| 5,372,737 A | 12/1994 | Spauschus | 252/68 |
| 5,520,833 A | 5/1996 | Kaneko | 252/68 |
| 5,750,046 A | * 5/1998 | Wheeler | 252/68 |
| 5,792,383 A | 8/1998 | Reyes-Gavilan et al. | 252/68 |
| 5,866,030 A | 2/1999 | Reyes-Gavilan et al. | 252/68 |
| 5,954,995 A | 9/1999 | Goble | 252/67 |
| 6,074,563 A | 6/2000 | Kaneko | 252/68 |

FOREIGN PATENT DOCUMENTS

| | | | |
|---|---|---|---|
| DE | 4226431 A1 | 8/1992 | ............ C09K/5/04 |
| EP | 0693546 A1 | 1/1996 | ........ C10M/171/00 |
| EP | 0 784 090 A | 7/1997 | |
| EP | 0659862 B1 | 6/1998 | ............ C09K/5/04 |
| EP | 0 908 509 A | 4/1999 | |
| EP | 0699742 B1 | 5/1999 | ........ C10M/171/00 |
| GB | 2291884 A | 2/1996 | ............ C09K/5/04 |
| JP | 18491-1992 | 1/1992 | |
| JP | 59388-1993 | 3/1993 | |
| JP | 125374-1993 | 5/1993 | |
| JP | 220430-1994 | 8/1994 | |
| JP | 77364-1995 | 3/1995 | |
| JP | 173462-1995 | 7/1995 | |
| JP | 41448-1996 | 2/1996 | |
| JP | 85798-1996 | 4/1996 | |
| JP | 157847-1996 | 6/1996 | |
| JP | 311471-1996 | 11/1996 | |
| JP | 40981-1997 | 2/1997 | |
| JP | 118879-1997 | 5/1997 | |
| JP | 208940-1997 | 8/1997 | |
| JP | 306289-1998 | 11/1998 | |
| JP | 44938-2000 | 2/2000 | |
| WO | 94/12544 | 5/1995 | ............ C09K/5/04 |
| WO | 95/01717 | 2/1996 | ............ C09K/5/04 |
| WO | 95/01737 | 2/1996 | ............ C09K/5/04 |
| WO | WO 96 07721 | 3/1996 | |
| WO | 96/02574 | 5/1997 | ............ C09K/5/04 |
| WO | 97/03286 | 6/1998 | ............ C09K/5/04 |
| WO | WO 99 36485 | 7/1999 | |

OTHER PUBLICATIONS

J. Reyes–Gavilan, G. Flak, T. Tricak, C. Barbour, "Enhanced Naphthenic Refrigeration Oils for Household Refrigerator Systems", ASHRAE Transactions: Research, pp. 95–106 (No Date).

S. Sundaresan, M. Pate, T. Doerr, D. Ray, "AComparison of the Effects of Poe and Mineral Oil Lubricants on the In–Tube Evaporation of R–22, R–407C and R–410A", pp.187–192 (No Date).

S. Sundaresen, J. Judge, W.Chu, R.R. Rademacher, "A Comparison of Oil Return Characteristics of R–22/Mineral Oil and its HFC Alternatives (R–407C andR–410A) with Mineral Oil and POE in a Residential Heat Pump", pp. 297–302 (No Date).

* cited by examiner

*Primary Examiner*—Steven O. Douglas
(74) *Attorney, Agent, or Firm*—Colleen D. Szuch

(57) ABSTRACT

Provided are methods of introducing environmentally desirable refrigerants into refrigeration systems. The present methods involve recharging a refrigerant system that contains a chlorine-containing refrigerant and a lubricant comprising the steps of (a) removing the chlorine-containing refrigerant from the refrigeration system while retaining a substantial portion of the lubricant in said system; and (b) introducing to said system a composition comprising: (i) a refrigerant; (ii) a surfactant; and (iii) a solubilizing agent.

17 Claims, No Drawings

METHOD OF INTRODUCING REFRIGERANTS INTO REFRIGERATION SYSTEMS

CROSS-REFERENCE TO RELATED APPLICATIONS

This application claims the benefit of U.S. Provisional Application No. 60/235,746 filed Sep. 27, 2000.

FIELD OF INVENTION

The present invention relates generally to methods of introducing environmentally desirable refrigerants into refrigeration systems. More specifically, this invention relates to methods for removing chlorofluorocarbons and hydrochlorofluorocarbons from refrigeration systems and charging refrigeration systems with environmentally desirable refrigerant compositions.

BACKGROUND

The use of chlorine-containing refrigerants, such as chlorofluorocarbons ("CFC's"), hydrochlorofluorocarbons ("HCFC's") and the like, as refrigerants in air conditioning and refrigerating equipment has become disfavored due to the ozone-depleting properties associated with such compounds. As a result, it has become desirable to "retrofit" chlorine-containing refrigeration systems by replacing chlorine-containing refrigerants with non-chlorine-containing refrigerant compounds which will not deplete the ozone layer, such as hydrofluorocarbons ("HFC's").

Unfortunately, many non-chlorine-containing refrigerants, including HFC's, are relatively insoluble and/or immiscible in the types of lubricants used traditionally with CFC's ("hydrocarbon-based lubricants") including, for example, mineral oils, alkylbenzenes or polyalphaolefins. This is problematic because in order for a refrigerant/lubricant system to work efficiently within a refrigeration or air conditioning system, the refrigerant must be sufficiently soluble in the lubricant over a wide range of operating temperatures. Such solubility lowers the viscosity of the lubricant and allows it to flow more easily throughout the system. In the absence of such solubility, lubricants tend to become lodged in the coils of the refrigeration system evaporator, as well as other parts of the system, and thus reduce the system efficiency.

To avoid such problems, traditional methods for retrofitting refrigeration systems require the steps of: (a) removing all chlorine-containing refrigerant and at least 95% of the hydrocarbon-based lubricant from the system; followed by (b) introducing to the system a new non-chlorine-containing refrigerant composition and a replacement lubricant compatible therewith.

The present inventors have come to appreciate that such traditional methods are disadvantageous for several reasons. For example, one disadvantage is that removal of lubricants, and particularly hydrocarbon-based lubricants which have heretofore frequently been used, from a refrigeration system via flushing or other methods tends to be time-consuming and costly. Another disadvantage is that many replacement lubricants, such as esters, are very sensitive to moisture and must be handled with great care. Yet another disadvantage is that replacement lubricants do not perform efficiently certain functions, such as noise reduction, which are associated with hydrocarbon-based lubricants.

Recognizing these and other drawbacks of the prior art, the present inventors have perceived a need for a new, efficient and more desirable method for introducing environmentally desirable refrigerants into refrigeration systems. These and other objects are achieved by the present invention as described below.

DESCRIPTION OF THE INVENTION AND PREFERRED EMBODIMENTS

The present invention is directed to methods of introducing environmentally desirable refrigerants into refrigeration systems. The methods of the present invention overcome the disadvantages of the prior art by facilitating the introduction of environmentally desirable, non-chlorine-containing refrigerant compositions into refrigeration systems without the removal of hydrocarbon-based lubricant already present in the system. Accordingly, non-chlorine-containing refrigerant compositions can be added to existing refrigeration systems containing hydrocarbon-based oils, such as mineral oils or alkyl benzenes, to form efficient and environmentally desirable refrigerant/lubricant systems with greater ease and less expense than traditional methods.

According to certain embodiments, the present methods involve recharging a refrigerant system that contains a chlorine-containing refrigerant and a lubricant comprising the steps of (a) removing the chlorine-containing refrigerant from the refrigeration system while retaining a substantial portion of the lubricant in said system; and (b) introducing to said system a composition comprising: (i) a refrigerant; (ii) a surfactant; and (iii) a solubilizing agent. As used herein, the term "substantial portion" refers generally to a quantity of lubricant which is at least about 50% (by weight) of the quantity of lubricant contained in the refrigeration system prior to removal of the chlorine-containing refrigerant. Preferably, the substantial portion of lubricant in the system according to the present invention is a quantity of at least about 60% of the lubricant contained originally in the refrigeration system, and more preferably a quantity of at least about 70%.

According to certain alternative embodiments, the present methods involve generally the steps of (a) providing a refrigeration system comprising a chamber having therein a hydrocarbon-based lubricant and substantially no chlorine-containing refrigerant; and (b) introducing to said chamber a composition comprising: (i) a refrigerant; (ii) a surfactant; and (iii) a solubilizing agent.

As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Those of skill in the art will recognize that the refrigeration systems used in the methods of the present invention generally comprise a chamber in which both a refrigerant and lubricant are contained and through which the refrigerant and lubricant can be circulated. According to certain embodiments of the present invention, the removal step (a) comprises removing a chlorine-containing refrigerant from a refrigeration system, especially from a chamber within the system, while leaving a substantial amount of lubricant, and preferably a hydrocarbon-based lubricant, in the system.

Any of a wide range of known methods can be used to remove chlorine-containing refrigerants from a refrigeration system while removing less than a major portion of the lubricant contained in the system. According to preferred embodiments, the lubricant is a hydrocarbon-based lubricant and the removal step results in at least about 90%, and even more preferably at least about 95%, of said lubricant remaining in the system. For example, because refrigerants are quite volatile relative to traditional hydrocarbon-based lubricants (the boiling point of refrigerants are generally under 10° C. whereas the boiling point of mineral oils are generally over 200° C.), the removal step may readily be performed by pumping chlorine-containing refrigerants in the gaseous state out of a refrigeration system containing liquid state lubricants. Such removal can be achieved in any of a number of ways known in the art, including, the use of a refrigerant recovery system, such as the recovery system manufactured by Robinair of Ohio. Alternatively, a cooled, evacuated refrigerant container can be attached to the low pressure side of a refrigeration system such that the gaseous refrigerant is drawn into the evacuated container and removed. Moreover, a compressor may be attached to a refrigeration system to pump the refrigerant from the system to an evacuated container. In light of the above disclosure, those of ordinary skill in the art will be readily able to remove chlorine-containing lubricants from refrigeration systems and to provide a refrigeration system comprising a chamber having therein a hydrocarbon-based lubricant and substantially no chlorine-containing refrigerant according to the present invention.

The introduction step (b) of the present invention comprises introducing to a hydrocarbon-based lubricant a composition comprising: (i) a refrigerant; (ii) a surfactant; and (iii) a solubilizing agent.

Any of a wide range of non-chlorine-containing refrigerants can be used in the present invention. Examples of refrigerants suitable for use in the present invention include HFC's, such as 1,1,1,2-tetrafluoroethane ("R-134a "), pentafluoroethane ("R-125") difluoromethane ("R-32"), isomers of trifluoroethane ("R-143" and "R-143a"), isomers of pentafluoropropane (for example, "R-245fa", "B-245ea", "R-245ca" and "B-245eb"), and mixtures thereof, such as, R-407A, R-407B, R-407C, R-410A, R-404A, R-507A, R-508A and R-508B.

The surfactant used in the present invention can be any surfactant which, when added to a composition comprising a hydrocarbon-based lubricant component and a non-chlorine-containing refrigerant component, increases the solubility or dispersibility of one component in the other by at least 1% (absolute) by weight of the lubricant/refrigerant composition. Preferably, the surfactant used increases the solubility or dispersibility of one component in the other by at least 2 weight % (absolute), and even more preferably by at least 5 weight % (absolute). For example, a composition of Refrigerant A and Lubricant B is a single phase composition when it comprises up to and including, but no more than, 10% by weight of composition of Refrigerant A. With the addition of a Surfactant C, the same composition remains as a single phase composition up to and including 15% by weight of the composition of Refrigerant A. For the purposes of the present invention, surfactant C is considered to increase the solubility of Refrigerant A in Lubricant B by 5 wt. %.

In certain preferred embodiments, the surfactant used increases the solubility and/or dispersibility of the refrigerant in the hydrocarbon-based lubricant and increases the solubility and/or dispersibility of the hydrocarbon-based lubricant in the refrigerant. Although applicants do not wish to be bound by or to any theory of operation, it is believed that the surfactant in such embodiments enhances solubility and/or dispersibility by reducing the interfacial tension between the two liquid layers. Typically, in such embodiments, the surfactant is soluble in the lubricant. According to certain preferred embodiments, the surfactant is soluble in both the refrigerant and the lubricant.

Examples of surfactants suitable for use in the present invention are disclosed in U.S. Pat. No. 5,254,280, issued to Thomas et al. and incorporated herein by reference, and include: sulfonates; long-chain alkyl substituted aromatic sulfonic acids; phosphonates; thiophosphonates; phenolates; metal salts of alkyl phenols; alkyl sulfides; alkylphenolaldehyde condensation products; metal salts of substituted salicylates; N-substituted oligomers or polymers from the reaction products of unsaturated anhydrides and amines. Other suitable surfactants include: polyoxyethylene-type nonionic surfactants, such as polyoxyethylene alkyl ethers, polyoxyethylene alkenyl ethers, polyoxyethylene aryl ethers, polyalkylaryl ethers, polyoxyethylene fatty acid esters, polyoxyethylene sorbitan fatty acid esters and polyoxyethylene sorbitol fatty acid esters; copolymers of methacrylates with N-substituted compounds, such as N-vinyl pyrrolidone or dimethylaminoethyl methacrylate; copolymers which incorporate polyester linkages, such as vinyl acetate-maleic anhydride copolymers; and the like. The alkyl groups of the polyoxyethylene alkyl ethers are preferably straight-chain or branched alkyl groups having from about 1 to about 15 carbon atoms which may, optionally, be further substituted with fluorine. The aryl groups of the Polyoxyethylene aryl ethers are preferably aromatic groups having from about 6 to about 20 carbon atoms. Such aromatic groups may, optionally, be further substituted with fluorine. According to certain preferred embodiments, the surfactant is a polyoxyethylene alkyl ether.

Although applicants do not wish to be bound by or to any theory of operation, it is believed that solubilizing agents according to the present invention act as carriers for the surfactant and aid the surfactant in enhancing the miscibility of hydrocarbon-based lubricants and refrigerants. In certain embodiments of the present invention, the surfactant is readily soluble in hydrocarbon-based lubricants but significantly less soluble in refrigerants. Accordingly, a solubilizing agent which is relatively soluble in both hydrocarbon-based lubricants and refrigerants, and in which a surfactant of the present invention in soluble, can be used to aid transport of the surfactant between lubricant and refrigerant to enhance the miscibility thereof. It is further believed that both the surfactant and the solubilizing agent independently enhance the solubility and dispersibility of the refrigerant in the lubricant.

Any of a wide range of solubilizing agents can be used in the present invention. Suitable solubilizing agents include polyalkylene glycol lubricants such as straight-chain or branched polypropylene glycols, polybutylene glycols, and random or ordered copolymers of ethylene oxide, propylene oxide, and/or butylene oxide in any combination. The polyalkylene glycols may have terminal hydroxyl groups and/or terminal moieties for capping one or more ends of the molecule. Suitable moieties for capping polyalkylene glycol of the present invention include: fluorinated alkyl or aryl groups; non-fluorinated alkyl or aryl groups; ester groups, and mixtures thereof. In addition, ester and diester lubricants based on acids having straight-chain or branched chains of from about 3 to about 15 carbon atoms and alcohols such as, for example, pentaerythritol, neopentyl glycol, glycerin, or trimethylolpropane are suitable for use as solubilizing agents in the present invention. Polyvinyl ethers (PVEs) are also suitable as solubilizing agents. PVEs are characterized generally by the formula $—[CH_2CHOR_1]_n—[CH_2CHOR_2]_m—$ wherein $R_1$ and $R_2$ are independently aromatic or alkyl groups containing from about 1 to about 15 carbon atoms with at least one of m or n being non-zero and ranging from 3 to 20. PVEs suitable for use in the present invention may optionally be substituted with fluorine or heteroatoms such as oxygen, nitrogen and sulfur. In certain preferred embodiments, the solubilizing agent is a polyalklene glycol having more units derived from butylene oxide than propylene oxide, and no more than 10 mole percent of ethylene oxide. In certain other preferred embodiments, the solubilizing agents are polybutylene glycols having terminal hydroxyl groups or straight-chain or branched polybutylene glycols having organic caps on one or more ends of the molecule, such as those disclosed in U.S. Pat. No. 5,154,846, incorporated herein by reference. In certain more preferred embodiments, the solubilizing agent is a straight-chain or branched polybutylene glycol having terminal hydroxyl groups.

The viscosity of the solubilizing agents used in the present invention may comprise any viscosity suitable for a particular application. In certain preferred embodiments, the viscosity of the solubilizing agent used in the present invention is from about 1 to about 20 centistokes at 100° C. More preferably, the solubilizing agent has a viscosity of from about 1 to about 10 centistokes at 100° C., and even more preferably from about 1 to about 5 centistokes at 100° C.

Procedures for preparing polyalkylene glycols suitable for use in the present invention are well known. For example, U.S. Pat. No. 5,254,280, discloses methods for preparing polybutylene glycols having fluorinated alkyl group caps. A wide variety of polyalkylene glycol lubricants are also commercially available, for example, polypropylene glycols and polybutylene glycols having terminal hydroxyl groups are available form Dow Chemical. Various ester-based lubricants are also available commercially, including, for example, Mobil EAL 22, an ester lubricant having a viscosity of 32 centistokes at 37° C., available commercially from Exxon-Mobil.

In addition to the refrigerant, surfactant and solubilizing agent, the composition introduced into the hydrocarbon-based lubricant according to the present invention can include other additives or materials of the type used in refrigerant compositions to enhance their performance in refrigeration systems. For example, the composition can include also extreme pressure and antiwear additives, oxidation and thermal stability improvers, corrosion inhibitors, viscosity index improvers, pour and floc point depressants, antifoaming agents, lubricants soluble in both the hydrocarbon-based lubricant and non-chlorine-containing refrigerant, viscosity adjusters and the like. Examples of such additives are disclosed in U.S. Pat. No. 5,254,280.

Any suitable amounts of the refrigerant, surfactant and solubilizing agent can be used in the practice of the present invention. In general, the weight ratio of hydrocarbon-based lubricant to non-chlorine-containing refrigerant is from about 0.1 to about 60 parts by weight of lubricant per 100 parts by weight of refrigerant. Preferably, the amount of hydrocarbon-based lubricant to non-chlorine-containing refrigerant is from about 15 to about 50 parts by weight of lubricant per 100 parts by weight of refrigerant, and even more preferably, from about 15 to about 30 parts by weight of lubricant per 100 parts by weight of refrigerant.

Furthermore the weight ratio of solubilizing agent to hydrocarbon-based lubricant is preferably from about 1 to about 50 parts by weight of solubilizing agent per 100 parts by weight of hydrocarbon-based lubricant, and more preferably, from about 5 to about 30 parts by weight of solubilizing agent per 100 parts by weight of hydrocarbon-based lubricant, and even more preferably, from about 5 to about 20 parts by weight of solubilizing agent per 100 parts by weight of hydrocarbon-based lubricant.

The weight ratio of surfactant to hydrocarbon-based lubricant is preferably from about 0.01 to about 10 parts by weight of surfactant per 100 parts by weight of hydrocarbon-based lubricant, and even more preferably, from about 1 to about 5 parts by weight of surfactant per 100 parts by weight of hydrocarbon-based lubricant.

Any of a wide range of methods for introducing the refrigerant composition to a refrigeration system comprising a hydrocarbon-based lubricant can used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can monitored. When a desired amount of refrigerant composition has been introduced into the system, charging is stopped. Alternatively, a wide range of charging tools, known to those of skill in the art, are commercially available. Accordingly, in light of the above disclosure, those of skill in the art will be readily able to introduce non-chlorine compositions into refrigeration systems according to the present invention without undue experimentation.

EXAMPLES

In order to illustrate, in a non-limiting manner, the present invention is described in connection with the following examples of the present method and comparative example.

Example 1

The following example illustrates a use of the present method with an air-conditioning system.

From an air-conditioning system containing chlorodifluoromethane ("R-22") and mineral oil is removed the R-22. A mixture of R-407C, polybutylene glycol and a surfactant is made. The mixture is added to the system. The system operates in satisfactory manner. The capacity of the system is within 10% of the capacity of a system comprising a mixture of R-407C and an ester lubricant. This indicates that there are no oil return problems.

Example 2

The following example illustrates a use of the present method with an air-conditioning system.

From an air-conditioning system containing chlorodifluoromethane ("R-22") and mineral oil is removed the R-22. A mixture of R-407C, PGB 503 (a polybutylene glycol having a molecular weight of 503 and a viscosity of 45 centistokes at 37° C.), and Brij 97 ($C_{18}H_{35}(OCH_2CH_2)_nOH$, wherein n is about 2) is made. The mixture is added to the system. The system operates in satisfactory manner. The capacity of the system is within 10% of the capacity of a system comprising a mixture of R-407C and an ester lubricant. This indicates that there are no oil return problems.

Example 3

The following example illustrates a use of the present method with an air-conditioning system.

From an air-conditioning system containing chlorodifluoromethane ("R-22") and mineral oil is removed the R-22. A mixture of R-407C, Mobil EAL 22 (an ester lubricant having a viscosity of 32 centistokes at 37° C.), and and Brij 97 ($C_{18}H_{35}(OCH_2CH_2)_nOH$, wherein n is about 2) is made. The mixture is added to the system. The system operates in satisfactory manner. The capacity of the system is within 10% of the capacity of a system comprising a mixture of R-407C and an ester lubricant. This indicates that there are no oil return problems.

Example 4

The following example illustrates a use of the present method with an air-conditioning system.

From an air-conditioning system containing chlorodifluoromethane ("R-22") and mineral oil is removed the R-22. A mixture of R-32 (22.5 wt. %), R-125 (24.5 wt. %), R-134a (51 wt. %), and R-600 (butane) (2 wt. %) is combined with Mobil EAL 22 and Brij 97 to form a refrigerant composition. The composition is added to the system. The system operates in satisfactory manner. The capacity of the system is within 10% of the capacity of a system comprising a mixture of R-407C and an ester lubricant. This indicates that there are no oil return problems.

Comparative Example 1

This comparative example illustrates the miscibility of a cooling composition consisting of 10 wt % refrigerant and 90 wt % mineral oil.

A mixture of R-407C and Suniso 3G mineral oil was prepared in a glass tube at 25° C. When the concentration of the R-407C was 10 wt. % and the concentration of the oil was 90 wt. %, the mixture had one phase. When the temperature was lowered to 0° C., the mixture became cloudy and two liquid phases appeared. When the concentration of the refrigerant was increased to 14 wt. %, there were two liquid phases at 25° C.

Comparative Example 2

This comparative example illustrates the miscibility of a cooling composition consisting of 90 wt % refrigerant and 10 wt % mineral oil.

A mixture comprising 90 wt. % of R-407C and 10 wt. % Suniso 3G mineral oil was prepared in a glass tube at 25° C. The mixture had two phases.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of recharging a refrigeration system of the type containing a chlorine-containing refrigerant and a lubricant, comprising the steps of:
   (a) removing said chlorine-containing refrigerant from said refrigeration system while leaving a substantial portion of said lubricant in said system; and
   (b) introducing to said lubricant left in said system a composition comprising:
       (i) a non-chlorine-containing refrigerant;
       (ii) a surfactant; and
       (iii) a solubilizing agent.

2. The method of claim 1 wherein said non-chlorine-containing refrigerant comprises an HFC.

3. The method of claim 1 wherein said non-chlorine-containing refrigerant is a mixture of two or more HFC compounds.

4. The method of claim 1 wherein said non-chlorine-containing refrigerant is R-407C.

5. The method of claim 4 wherein said surfactant comprises a polyoxyethylene-type nonionic surfactant.

6. The method of claim 5 wherein said surfactant is a polyoxyethylene alkyl ether.

7. The method of claim 4 wherein said solubilizing agent is an ester or polyvinyl ether.

8. The method of claim 1 wherein said surfactant enhances the solubility of said non-chlorine-containing refrigerant in said hydrocarbon-based lubricant by at least about 2 weight %.

9. The method of claim 1 wherein said surfactant enhances the solubility of said non-chlorine-containing refrigerant in said hydrocarbon-based lubricant by at least about 5 weight %.

10. The method of claim 1 wherein said surfactant enhances the solubility of said hydrocarbon-based lubricant in said non-chlorine-containing refrigerant by at least about 2 weight %.

11. The method of claim 1 wherein said surfactant comprises a polyoxyethylene-type nonionic surfactant.

12. The method of claim 1 wherein said surfactant is soluble in said solubilizing agent.

13. The method of claim 1 wherein said solubilizing agent comprises a polyalkylene glycol.

14. The method of claim 13 wherein said polyalkylene glycol comprises a polybutylene glycol compound.

15. The method of claim 14 wherein said polybutylene glycol compound has a viscosity of between about 1 and 20 centistokes at 100° C.

16. The method of claim 15 wherein said polybutylene glycol compound has a viscosity of between about 1 and 10 centistokes at 100° C.

17. The method of claim 16 wherein said polybutylene glycol compound has a viscosity of between about 1 and 5 centistokes at 100° C.

* * * * *